United States Patent [19]
Tipton

[11] 3,820,453
[45] June 28, 1974

[54] BALE ORIENTING MECHANISM
[76] Inventor: Lee Tipton, 15092 S. Topeka, Selma, Calif. 93662
[22] Filed: Dec. 4, 1972
[21] Appl. No.: 311,469

[52] U.S. Cl. ............... 100/188 R, 100/99, 177/136, 193/5
[51] Int. Cl. ............................................ B30b 15/32
[58] Field of Search ................. 100/100, 99, 188 R; 56/473.5, 347; 193/5, 43; 177/136

[56] References Cited
UNITED STATES PATENTS

| | | | |
|---|---|---|---|
| 2,458,994 | 1/1949 | Hill | 100/188 R |
| 2,529,842 | 11/1950 | Jones et al. | 100/188 R |
| 2,649,945 | 8/1953 | McClellan | 193/5 |
| 2,740,250 | 4/1956 | Olson et al. | 56/473.5 |
| 2,799,129 | 7/1957 | Huntley et al. | 100/188 R |
| 2,833,108 | 5/1958 | Kriva et al. | 56/473.5 |
| 2,947,400 | 8/1960 | Murray et al. | 100/188 R |
| 2,948,213 | 8/1960 | Jay et al. | 100/99 |
| 3,126,069 | 3/1964 | Shepley | 100/99 X |
| 3,243,028 | 3/1966 | Tufts | 193/5 |
| 3,363,707 | 1/1968 | Murray et al. | 177/136 |

*Primary Examiner*—Billy J. Wilhite
*Attorney, Agent, or Firm*—Huebner & Worrell

[57] ABSTRACT

A bale orienting mechanism for a hay baling machine or the like adapted for earth traversing movement and having a bale compression section, the mechanism having a platform mounted on the machine in bale receiving relation to the section for the support of a portion of each bale during discharge from the section and for gravitational discharge of each of said bales therefrom subsequent to discharge from the section; a chute pivotally mounted on the machine in bale receiving relation to the platform for the receipt of each of said bales in a preselected attitude; and a resiliently tensioned assembly mounting the chute on the machine for pivotal movement under the weight of a bale received therein to position a portion of the bale in contact with the earth during earth traversing movement of the machine so as to draw each of said bales from the chute in the preselected attitude.

3 Claims, 6 Drawing Figures

BALE ORIENTING MECHANISM

BACKGROUND OF THE INVENTION

The present invention relates to a bale orienting mechanism and more particularly to such a mechanism which is adapted to be mounted on any suitable baler to insure that bales are discharged therefrom in a precisely predetermined attitude and which automatically weighs each of the bales discharged from the machine to permit adjustment of the machine for the formation of bales of consistent weight.

As is well-known, conventional balers are driven along a windrow of hay or other material to be baled; the material is picked up by the baler and formed into bales of a box-like configuration; and the bales are discharged with indifferent consistency in longitudinal alignment and on edge. Subsequently a bale retrieving wagon is driven along the row of aligned bales so as to retrieve the bales and position them in stacked relation on the wagon for transport from the field.

Such operations are hindered by inefficient or inconsistent operation of conventional balers. A significant number of bales are not discharged from the baler in the desired attitude on edge and in longitudinal alignment. The conventional discharge chutes of these balers frequently permit bales to tumble from the machines so that they may be improperly positioned. Experience indicates that usually from 40 to 50 bales per thousand are not properly positioned but lay flat on the ground or are disposed transversely of the row being formed. Conventional bale retrieving wagons are not adapted to retrieve the bales which are not on edge and in longitudinal alignment. Consequently the operator of the wagon must stop the machine, reorient the improperly disposed bale and then proceed to pick it up with the wagon. Such delays are extremely aggravating in what should be a high speed operation, inefficient, and add materially to the expense of the baling operation.

Another deficiency inherent in conventional baling operations is the excessive variation in the weight of the bales produced by such machines. Standardization of bale weight and size is important in the handling and stacking of bales as well as in the transport and marketing of the baled product. Conventional balers do not consistently produce bales of the same weight although they have long sought to do so. Many balers are known to provide manual adjustment in an effort to achieve bale uniformity. The efficacy of such adjustment, however, has largely depended upon the attentiveness and expertise of the operator and the speed with which he could detect variations in hay quality and moisture content. Further, in large operations where a number of such balers are being used, there are usually significant variations between the balers aggravating the problems and extent of bale variation. A still further factor is that moisture content of the hay to be baled varies considerably depending on the time of day in which such baling is performed as well as in what areas of the field the baling takes place. Since the moisture content varies, the weight of the bales produced also varies.

Some conventionally available balers provide mechanisms for weighing the bales so that adjustment of the machine can be performed in an attempt to produce bales of the same weight. However, such mechanisms are not operable from the driver's seat so that the machine must be stopped and weighing performed while the machine is inoperable. This is not only inefficient but also aggravating to the operator so that weighing operations are not performed as frequently as should be the case. As a result, commercial experience indicates that loads of 400 bales from the same field frequently vary as much as a ton and a half under conventional baling practices. The mechanism of the present invention readily achieves such excellent control that loads of 400 bales usually do not vary more than 200 pounds, uniformity not previously attainable.

It has long been recognized as desirable to have an improved bale orienting mechanism for baling machines which consistently discharges the bales formed by the machine in the preselected attitude for subsequent retrieval and which permits weighing of each bale during such baling operations without the necessity of stopping the machine.

SUMMARY OF THE INVENTION

It is therefore an object of the present invention to provide an improved bale orienting mechanism for baling machines.

Another object is to provide such a mechanism which is adapted for mounting on conventionally available balers.

Another object is to provide such a mechanism which consistently discharges bales from the baling machine on which it is mounted in a preselected attitude for subsequent automated retrieval.

Another object is to provide such a mechanism which permits the weighing of each bale as it is discharged from the baling machine without the necessity of interrupting operation of the machine.

Another object is to provide such a mechanism which permits the formation of bales of consistent weight even where quality and moisture content of the hay varies and even if several baling machines are used in one baling operation.

Another object is to provide such a mechanism which increases the speed and efficiency with which baling operations can be performed.

Another object is to provide such a mechanism which is of extremely simplified construction so as to be of maximum reliability in operation.

A further object is to provide such a mechanism which is durable.

A still further object is to provide such a mechanism which is of minimal expense to construct and install and therefore to purchase.

Other objects and advantages of the present invention will subsequently become more clearly apparent upon reference to the following description.

DESCRIPTION OF THE PREFERRED EMBODIMENT

Figure 1:
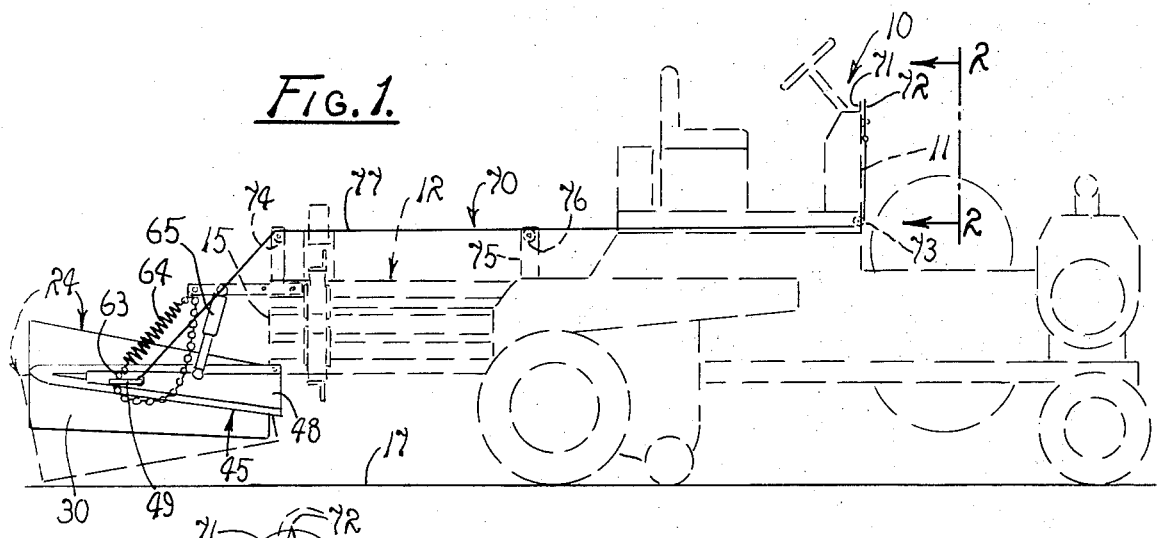
FIG. 1 is a side elevation of a conventional baling machine shown in dashed lines having the bale orienting mechanism of the present invention mounted thereon.
Figure 4:
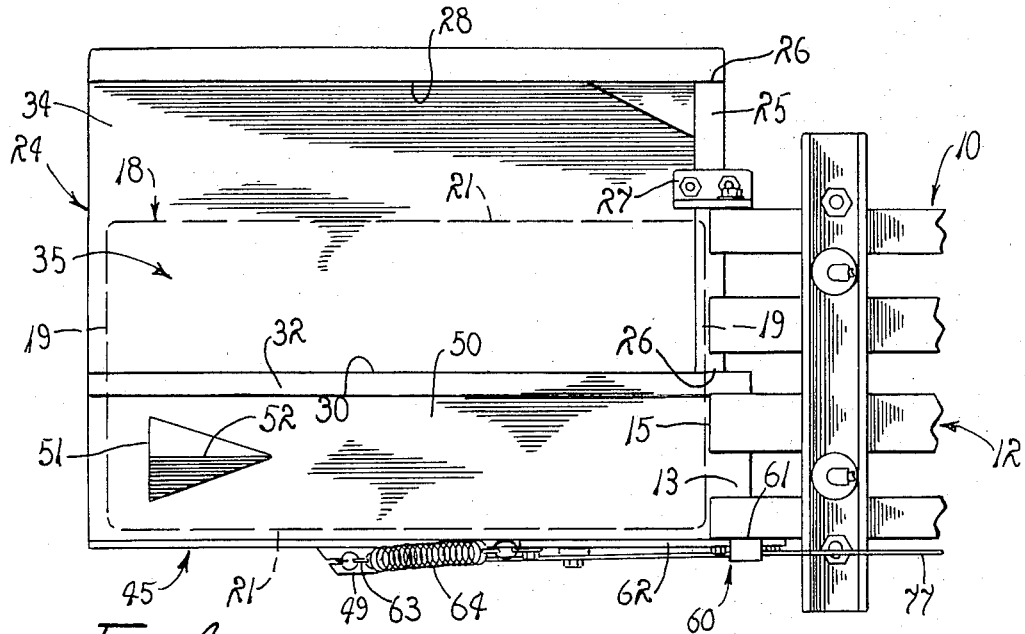
FIG. 4 is a top plan view of the mechanism.

Referring more particularly to the drawings, a conventional self-propelld baler or baling machine is shown in FIG. 1 and generally indicated by the numeral 10. The baling machine has an upright dashboard 11 for the display of controls for operation of the machine. A rectangular bale case or compression section 12 is extended rearwardly of the machine in alignment with its intended direction of travel and defines a bale forming chamber 13. The section has parallel opposite sides 14 defining a throat or discharge end 15 for the compression section. A pair of mounting flanges 16 are integrally provided on the opposite sides of the section at the discharge end thereof. The machine is adapted for movement over the earth 17 and for the formation of bales 18 which are longer than they are wide and wider than they are thick. As shown in dashed lines in FIGS. 4 and 5, the bales have opposite ends 19, opposite sides 20, and opposite edges 21.

Figure 5:
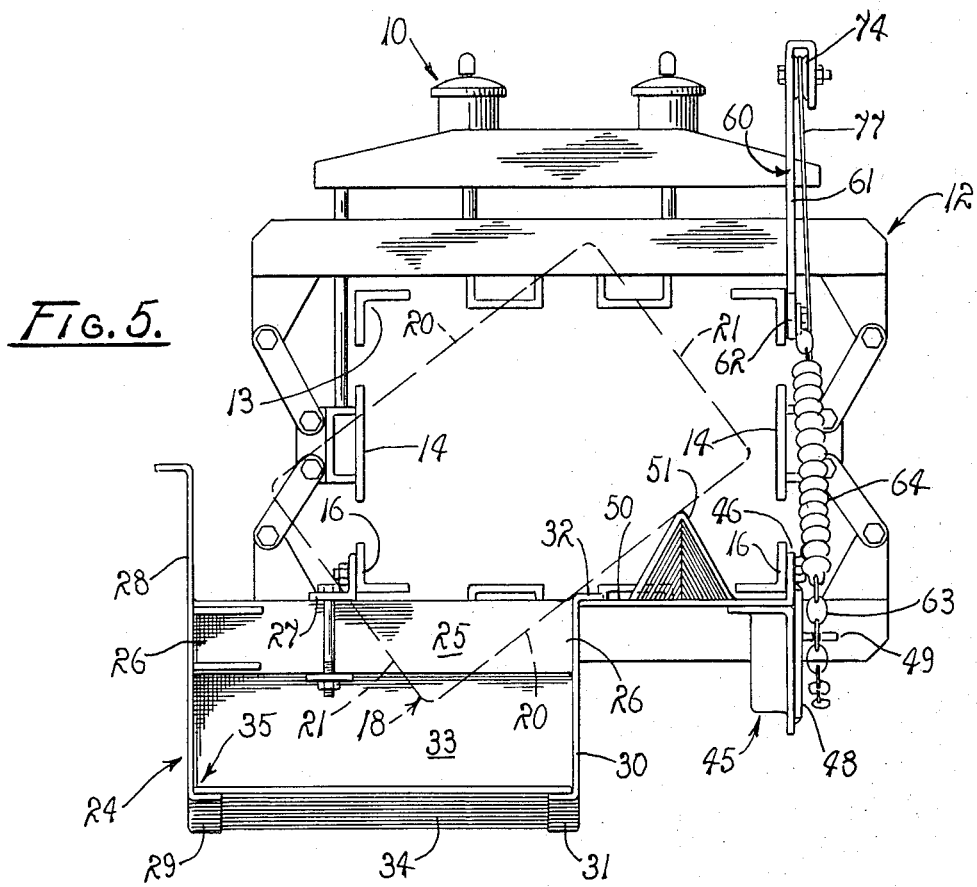
FIG. 5 is a rear elevation of the mechanism.

The bale orienting mechanism of the present invention is generally indicated by the numeral 24 in FIG. 1 and is shown mounted on the discharge end 15 of the compression section 12 of the baling machine 10. The mechanism has a mounting bar 25 having opposite ends 26. A pivot flange 27 is mounted on the mounting bar and upwardly extends therefrom and is pivotally secured on one of the mounting flanges 16 of the compression section. Thus, the mounting bar is mounted for pivotal movement in offset relation to the forming chamber 13 as shown in FIG. 5. The bar extends transversely of the direction of travel of the machine. A guide or side wall 28 is secured, as by welding, on the opposite end of the bar which extends the farthest laterally of the section. The wall is in alignment with the direction of travel of the machine and extends rearwardly of the bar with respect to the direction of travel. The side wall has an inwardly bent lower edge 29 extending longitudinally of the side wall.

Figure 6:
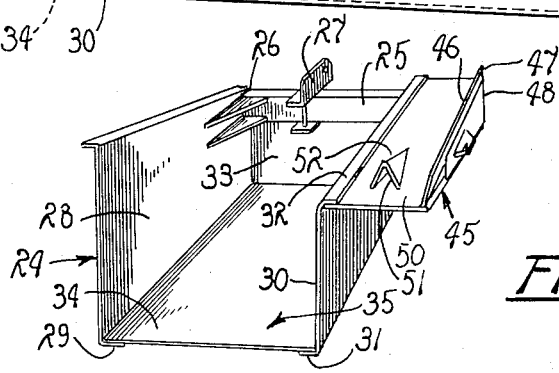
FIG. 6 is a perspective view of the mechanism.

Another guide or interior wall 30 is affixed on the other opposite end 26 of the mounting bar 25 substantially parallel to the side wall 28 and extending rearwardly of the machine 10. The interior wall has a bent lower edge 31 which extends toward the side wall in a substantially common plane with the lower edge 29 of the side wall. The interior wall has an outwardly bent upper edge 32 extending away from the side wall. A back wall 33 is fastened on the mounting bar and the side wall and interior wall of the mechanism 24, as shown best in FIG. 6. A floor 34 is secured on the bent lower edges 29 and 31 of the side wall and an interior wall respectively so as to form a trough or chute 35 therewith. The side wall and interior wall are spaced a distance less than the width of standard sized bales, but more than the thickness thereof.

Figure 3:
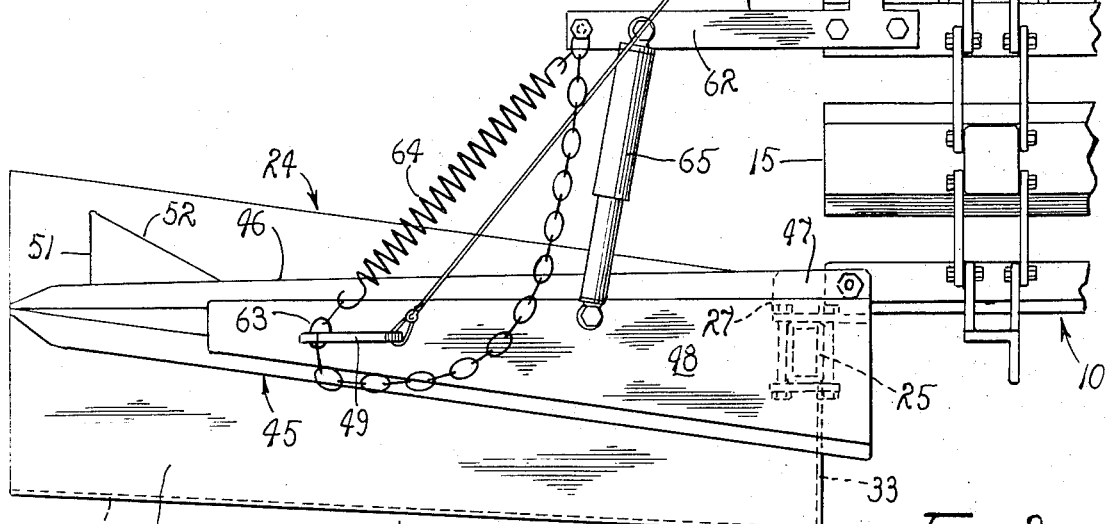
FIG. 3 is a somewhat enlarged side elevation of the bale orienting mechanism of the present invention mounted on the compression section of the baling machine.

A tapered arm 45, having an upper edge 46 and a pivot flange 47 at one end thereof, is mounted for pivotal movement on the other available mounting flange 16 of the compression section 12 and extends rearwardly therefrom substantially parallel to the side wall 28 of the chute 35. The arm has an exterior side 48 facing away from the chute, as best shown in FIG. 5. A bracket 49 is secured on the exterior side of the arm in spaced relation to the pivot flange 47, as shown in FIG. 3. A shelf or platform 50 is affixed on the outwardly bent upper edge 32 of the interior wall 30 and the upper edge 46 of the tapered arm in substantially horizontal relation. The platform extends substantially the entire length of the tapered arm. A guide 51 is fastened in upwardly extending relation on the platform 50 at a position remotely spaced from the pivot flange 47. The guide displays a sloped edge 52 extending at an angle upwardly from the platform and away from the bale forming chamber 13.

A support frame 60 is mounted on the opposite side 14 of the compression section 12 in vertical alignment with the bracket 49. The support frame consists of an upwardly extending arm 61 and an integral, rearwardly extending arm 62, as shown best in FIG. 3. A link adjustment chain 63 is fastened on the bracket 49 of the tapered arm. A counterbalance spring 64 is secured so as to interconnect a selected link of the chain and the remote end of the rearwardly extending arm of the support frame. The spring resiliently supports the chute 35 in pivotal position extending rearwardly of the compression section 12. A shock absorber 65 is mounted at one of its ends on the rearwardly extending arm 62 and is fastened at the other of its ends on the tapered arm midway between the bracket 49 and the pivot flange 47.

Figure 2:
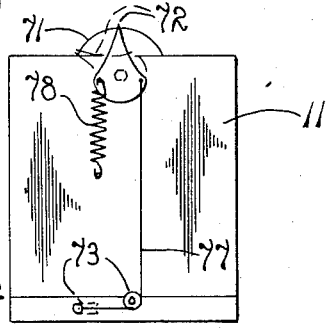
FIG. 2 is a front elevation taken on line 2—2 in FIG. 1.

A weighing mechanism 70 interconnects the chute 35 and the baling machine 10, as best shown in FIG. 1. The mechanism consists of a dial 71, displaying indicia for signaling the weight of a bale, is secured on the dashboard 11, as shown in FIG. 2. An indicator needle 72 is fastened for pivotal movement in facing relation to the dial. A pair of pulley assemblies 73 are operatively mounted in spaced relation on the dashboard spaced from the indicator needle. A support pulley assembly 74 is affixed on the remote end of the upwardly extending arm 61. Another arm 75 is mounted on the baling machine intermediate the compression section 12 and the dashboard 11 in upwardly extending relation. A tension pulley assembly 76 is secured on the upwardly extending end of the arm. A cable 77 is secured to the bracket 49 at one of its ends, extended through the support pulley assembly 74, extended through the tension pulley assembly 76, extended through the pair of pulley assemblies 73, and operably connected to the indicator needle 72, as shown in FIG. 2. A tension spring 78 interconnects the dashboard and the needle to limit the pivotal movement thereof, as shown in FIG. 2. The arrangement of the indicia on the dial 71, the positioning of the indicator needle 72, the tension of the spring, and the length of the cable 77 are operably adjusted so as to provide a reading of desired accuracy. The chute 35 is preferably supported in rearwardly extending relation on the discharge end 15 of the compression section 12 in the attitude shown in FIG. 3.

OPERATION

The operation of the described embodiment of the subject invention is believed to be clearly apparent and is briefly summarized at this point. The baling machine 10 is driven in the conventional fashion along a windrow of material, such as hay, to be baled and is operated so as to deliver the material to the compression section 12 so as to form bales in the conventional fashion. Baling machines are adjustable so as to form bales of varied weights and sizes, the significance of which will subsequently become more clearly apparent. As a bale 18 is progressively discharged from the compression section 12 by passing through the discharge end 15 thereof it is rested on the platform 50 of the mechanism 24. As evident in FIG. 4, the platform is of a width considerably narrower than that of the bale being formed. The opposite sides 14 of the compression section maintain the bale in position rested on the platform during such discharge. As the bale continues to move rearwardly, the opposite end 19 thereof first discharged from the section contacts the sloped edge 52 of the guide 51 which causes that end of the bale to begin to be elevated from its supported position on the platform. By the time the other end of the bale is discharged from the section the guide has elevated a significant portion of the bale from the platform so that without the support of the opposite sides 14 of the section the bale falls from the platform and guide into the chute 35 and onto the floor 34 thereof. The close proximity of the side wall 28 and interior wall 30 insures that the bale is supported on the floor of the chute on one of its opposite edges 21, as can be visualized in FIG. 5.

The weight of the bale 18 as it is progressively supported on the platform 50 and subsequently as it is fully supported by the floor 34 causes the chute 35 to be pivoted downwardly against tension of the spring 64 toward the earth 17. Such downward pivotal movement of the chute causes the bale to slide rearwardly on the floor so as to bring its opposite end 19 into contact with the earth during earth traversing movement of the baling machine 10. Such contact with the earth and the angle at which the chute is pivoted toward the ground causes the bale to be drawn from the chute in the desired attitude on its edge 21 in alignment with the direction of travel of the machine. Tumbling of the bales is precluded. Thus, the configuration of the chute and the manner in which the bale is drawn from the chute insure that each bale is disposed on edge in precisely this desired attitude.

During discharge of the bale 18 from the discharge end 15 of the compression section 12, the mechanism 24 pivots under the weight of the bale toward the earth 17, as described. Such pivotal movement causes the cable 77 of the weighing mechanism 70 to be drawn rearwardly in the pulleys 73, 74 and 76. This causes the indicator needle 72 to be drawn against the tension of the spring 78 so as to indicate an increasingly greater weight on the dial 71 of the dashboard 11. When the bale is fully supported by the discharge chute and before the bale contacts the earth, movement of the indicator needle displays the weight of the bale supported thereon for reading by the operator of the baling machine 10. While such a reading may not be precisely accurate due to the movement of the machine and the possibility for error in such a mechanism, the reading provided is accurate within recognized tolerances and is sufficient to provide the operator with the information necessary for judging whether bales of the desired weight are being formed.

Since, as previously noted, conventional baling machines are selectively adjustable to form bales of varying sizes and weights, the operator can periodically adjust the machine in accordance with the reading provided by the weighing mechanism. As is well known, such adjusting is accomplished by constricting the sides of the compression section 12 against the bale therein, to resist movement of the bale so that the succeeding bale being compressed thereagainst is made more compact or by releasing the sides of the compression section to permit the bale therein to move more easily so that the succeeding bale being compressed thereagainst is less compacted. The various systems for constricting and releasing the sides of the compression section form no part of the present invention and are not described in greater detail.

By frequent visual reference to the needle 72 in reference to the dial 71 and prompt corrective measures, the bales discharged from the machine can be maintained at a consistent weight although other factors such as the moisture content of the material being baled and variations in the material itself may vary considerably. Thus, in a large baling operation where several baling machines are being employed the operators can select a uniform preferred weight for the bales to be formed and all of the machines can thereafter consistently produce bales of that selected weight. Experience shows that the bale orienting mechanism 24 of the present invention can readily limit error for any given 400 bales produced to within 200 pounds tolerance. This corresponds to the conventional variation of as much as 3,000 pounds per 400 bale load.

When a bale has been drawn from the chute 35, the mechanism 24 is thereby released and pivotally returns to the normal or rest position, as shown in FIG. 3, by means of the counterbalance spring 64. The shock absorber 65 prevents rapid return to this position which might damage the mechanism or compression section 12. Thus, the platform 50 is returned to support the next successive bale discharged from the section.

The bale orienting mechanism of the present invention insures that each bale discharged from the baling machine on which the chute is mounted is oriented on edge extending longitudinally of the direction of travel of the machine in alignment with the other bales discharged from the machine. The mechanism thereby makes it possible for the bales to be retrieved by an automatic pick-up wagon without the necessity of stopping to reorient the bales into their proper positions. Furthermore, the machine allows weighing of each bale discharged from the machine during operation so that the machine can be adjusted during such operation to discharge bales of a selected weight quickly, easily and accurately without interrupting operation. The mechanism thus maximizes the efficiency of baling operations and minimizes the expense of delays concomitant with conventional baling operations.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In an earth traversing baling machine having a bale chamber communicating with a rearwardly disposed substantially horizontal bale discharge throat from which elongated bales which are longer than they are wide and wider than they are thick are longitudinally discharged in a flat attitude; a bale orienting mechanism comprising an elongated chute having a transversely substantially horizontal floor and predetermined forward and rearward ends, walls upwardly extended along opposite sides of the floor spaced a distance less than the width of such bales but more than the thickness thereof, and a shelf transversely extended substantially horizontally from one of the side walls in a direction away from the opposite side wall, said floor being disposed at an elevation below the shelf; means mounting the forward end of the chute on the baling machine with the chute rearwardly extended from the throat for elevational pivotal movement between a rearwardly and upwardly inclined position and a position with the floor rearwardly sloped with its rearward end adjacent to the ground, the forward end of the shelf being substantially flush with the throat to receive bales therefrom and being of a width less than the width of the bales, the chute being laterally offset from the throat so that the side wall from which the shelf is extended is substantially centrally aligned with the throat, the floor, walls and shelf being integral for pivotal movement in fixed relation; and means resiliently supporting the rearward end of the chute whereby a bale discharged from the throat is first supported along a side by the shelf while the opposite side descends between the side walls to turn the bale on edge between the walls, the weight of the bale depresses the rearward end of the chute to its position adjacent to the ground, the bale slides rearwardly along the chute until the rearward end of an edge thereof engages the ground and earth traversing movement of the baling machine draws the bale from the chute on edge aligned with the direction of movement of the machine.

2. The mechanism of claim 1 wherein the wall of the chute remote from the shelf adjacent to the rearward end of said chute has a height substantially greater than one-half the height of a bale received on edge in the chute to guide the drawing of said bale from the chute by ground engagement to preclude misalignment.

3. The mechanism of claim 2 in which a rearwardly, upwardly sloped guide is borne by the shelf spaced from the throat in position to initiate turning of the bale during discharge from the throat to insure edgeward orientation of the bale subsequent to discharge from the shelf.

* * * * *